United States Patent [19]

Yang

[11] Patent Number: 5,000,861

[45] Date of Patent: Mar. 19, 1991

[54] STABLE EMULSIONS CONTAINING AMINO POLYSILOXANES AND SILANES FOR TREATING FIBERS AND FABRICS

[75] Inventor: Sue-Lein L. Yang, Thornwood, N.Y.

[73] Assignee: Union Carbide Chemical and Plastics Co. Inc., Danbury, Conn.

[21] Appl. No.: 397,502

[22] Filed: Aug. 23, 1989

[51] Int. Cl.$^5$ .................. D06M 15/647; D06M 13/51
[52] U.S. Cl. ...................................... 252/8.6; 252/8.8
[58] Field of Search .................. 252/8.6, 8.7, 8.75, 252/8.8, 8.9

[56] References Cited

U.S. PATENT DOCUMENTS

| | | | |
|---|---|---|---|
| 3,876,459 | 4/1975 | Burrill | 117/141 |
| 3,980,599 | 9/1976 | Kondo et al. | 260/29.2 |
| 4,137,179 | 1/1979 | Koerner et al. | 252/8.6 |
| 4,247,592 | 1/1981 | Kalinowski | 428/266 |
| 4,419,391 | 12/1983 | Tanaka et al. | 252/8.8 |
| 4,541,936 | 9/1985 | Ona et al. | 252/8.6 |
| 4,725,635 | 2/1988 | Okada et al. | 524/114 |
| 4,810,253 | 3/1989 | Kasprzak et al. | 252/8.8 |

FOREIGN PATENT DOCUMENTS 58-214585 12/1983 Japan .
61-15191 4/1986 Japan .

Primary Examiner—A. Lionel Clingman
Assistant Examiner—J. Darland
Attorney, Agent, or Firm—Bonnie L. Deppenbrock

[57] ABSTRACT

A stable aqueous emulsion composition containing an amino-functionalized polyorganosiloxane containing at least two amino-functionalized groups per molecule, one or more silanes and optionally a hydroxy terminated polydiorganosiloxane; textiles treated with the stable aqueous emulsion compositions; and processes for the preparation of stable aqueous emulsions of amino-functional polyorganosiloxanes by the addition of one or more hydrolyzable-functional silanes to an aqueous emulsion containing an amino-functional polyorganosiloxane and optionally, a hydroxy terminated polydiorganosiloxane.

18 Claims, No Drawings

STABLE EMULSIONS CONTAINING AMINO POLYSILOXANES AND SILANES FOR TREATING FIBERS AND FABRICS

BRIEF DESCRIPTION OF THE INVENTION

This invention relates to (1) the preparation of a stable amino silicone emulsion containing silanes and (2) a method to incorporate desired condensable functionality into a textile finish by the addition of a hydrolyzable-functional silane.

BACKGROUND TO THE INVENTION

Emulsions of special categories of polydiorganosiloxanes have been described in the literature to impart slickness, softness and water repellency to textiles such as natural fibers (e.g., such as cotton, flax, silk and wood), synthetic fibers (e.g.. such as polyester, polyamide, polyacrylonitrile and polypropylene) and inorganic fibers (e.g., such as glass fiber and carbon fiber). Illustrative are:

Burrill, U.S. Pat. No. 3,876,459, patented Apr. 8, 1975, describes the treatment of wool to render it resistant to shrinkage on washing with from 0 1 to 10% by weight of a composition obtained by mixing (A) a polydiorganosiloxane having terminal silicon-bonded hydroxyl radicals and (B) an organosilane $RSiR'_nX_{3-n}$, in which R is a monovalent radical containing at least two amine groups, R' is alkyl or aryl, X is alkoxy and n is 0 or 1, and/or a partial hydrolyzate and condensate of the silane.

Kondo et al, U.S. Pat. No. 3,980,599, patented Sept. 14, 1976, describe a fiber finishing emulsion containing an epoxyfunctional polydiorganosiloxane and an aminoalkyltrialkoxysilane.

Koerner et al, U.S. Pat. No. 4,137,179, patented Jan. 30, 1979, relates to the production of a stable emulsion which contains a hydroxy terminated polydiorganosiloxane and an "aminoalkoxysilane."

Kalinowski, U.S. Pat. No. 4,247,592, patented Jan. 27, 1981, describes a method for treating "a fire retardant synthetic textile" with an emulsion containing a specific amino-functional polydiorganosiloxane.

Ona et al, U.S. Pat. No. 4,541,936, patented Sept. 17, 1985, disclose a method for treating fibers with an aqueous emulsion comprising an amino-functional polydiorganosiloxane and a silane bearing a hydrophilic group having "the general formula $$(R^2)_3Si-Z-O-R^3$$

wherein $R^2$ represents an alkoxy or alkoxyalkoxy group having from 1 to 5 carbon atoms, Z represents a divalent hydrocarbon group and $R^3$ represents a hydrogen atom, a hydroxyl group-containing alkyl group or a polyoxyalkylene group or a partial hydrolysis condensate of said silane."

Okada et al, U.S. Pat. No. 4,725,635, patented Feb. 16, 1988, utilize a fiber finishing emulsion composition which employs a hydroxy or alkoxyl terminated amino-functional polydiorganosiloxane and an epoxy silane.

Tetsuo Nakamura et al, Japanese Pat. No. 61-15191 (1986), disclose a synthetic fiber finishing agent comprising an amino-functional polydiorganosiloxane, a hydroxy terminated polydiorganosiloxane and a silane having an aminoalkyl, an epoxy or an alkenyl group. More significantly, the same patentees in their application Kokai No. 58[1983]-214,585, dated Dec. 13, 1983, have a broader description of compositions suitable for use as fiber finishing agents, as follows:

Softening and smoothing finishing agents for synthetic fibers characterized in that they contain
(a) 10-85 weight % of an aminopolysiloxane;
(b) 10-85 % of a terminal-hydroxy polysiloxane which contains hydroxy groups linked to a terminal silicon; and
(c) 5-25 weight % of an alkoxysilane which can be expressed by the following general formula

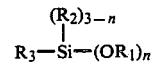

(where $R_1$ and $R_2$ are alkyl groups, $R_3$ is an alkyl group, alkenyl group, aryl group, one or more reactive group-substituted alkyl groups, or one or more reactive group-substituted alkenyl, and n is an integer of 1-3.

In general, the above mentioned compositions containing silanes are mixed and often diluted immediately prior to use; there is no indication of long term bulk stability of these compositions.

None of the foregoing references address the issue of the number of aminoalkyl groups that are present in each molecule of the aminoalkyl polysiloxanes. None appear to find any criticality associated with the number of such aminoalkyl groups in each molecule of the aminoalkyl polysiloxane.

THE INVENTION

This invention relates to (1) the preparation of a stable amino-functionalized silicone emulsion containing silanes and (2) a method to incorporate desired condensable functionality into a textile finish by the addition of a hydrolyzable functional monovalent hydrocarbyl silane. This invention utilizes certain hydrolyzable-functional monovalent hydrocarbyl silanes in a special category of amino functionalized silicone emulsion without adversely affecting the stability of the emulsion. More particularly, this invention includes the use of oil soluble hydrolyzable-functional monovalent hydrocarbyl silanes in aqueous emulsions containing select amino-functionalized silicones at a level as high as, e.g., 40 weight percent, based on the silicone content.

This invention relates to stable aqueous emulsion compositions which comprise a class of amino functionalized polyorganosiloxanes containing an average of at least two (2) amino-functionalized groups per molecule, one or more silanes and optionally a hydroxy terminated polydiorganosiloxane. More particularly, the present invention relates to the use of the above mentioned stable emulsions for the treatments of fibers and fabrics to impart slickness, softness, compression resistance, water repellency or hydrophilicity to the substrates.

The term "amino-functionalized groups" means any group that contains at least one amino nitrogen in which the nitrogen contains nitrogen bonded hydrogen. Illustrative of such groups are the following:

(i) 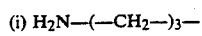

(ii) 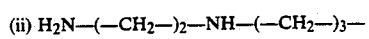

(iii)
$$H_2N-(-CH_2-)_2-NH-(-CH_2-)_2-NH-(-CH_2-)_3-;$$

and the like.

In these illustrative amino-functionalized groups, group (i) is monoamino and as such will provide a single amino functionalized group per molecule, group (ii) is diamino and as such will provide two amino functionalized groups per molecule, and group (iii) is triamino and as such will provide three amino functionalized groups per molecule.

The invention encompasses the preparation of stable aqueous emulsions by the addition of one or more hydrolyzable-functional silanes to an aqueous emulsion containing an amino-functional polyorganosiloxane containing an average of at least two (2) amino-functionalized groups per molecule, and optionally, a hydroxy terminated polydiorganosiloxane. Therefore, the three silicone components involved in this invention include (a) a liquid amino-functional polyorganosiloxane containing an average of at least 2 amino-functionalized groups per molecule, (b) a hydroxy terminated polydiorganosiloxane and (c) a nonfunctionalized organo hydrolyzable-functional silane. In the context of this invention, the term "nonfunctionalized" means the group so characterized is not functionally reactable with the amino functionality under the normal conditions of usage, as herein contemplated.

The invention is directed to an aqueous emulsion formulation containing an oil phase and a water phase, wherein there is provided in the emulsion a normally liquid organopolysiloxane of the formula $$R_n R^o{}_m SiO_{(4-n-m)/2} \quad \text{I}$$

wherein n is a number averaging per Si in the range from about 0.001 to about 2.5, m is a number averaging per Si in the range from about 0.0001 to about 2, the average value of (4-n-m)/2 ranges from about 0.5 to 1.98, R is one or more organo groups bonded to the Si by a carbon to silicon bond, $R^o$ is an aminoorgano (i.e., amino-functionalized) group bonded to the Si by a carbon to Si bond, there are at least two amino-functionalized groups per molecule of liquid organopolysiloxane (preferably, there are at least two $R^o$ per molecule of liquid organopolysiloxane), and the ratio of the sum of R and $R^o$ to Si in the liquid organosiloxane is about 3 to about 1.98; and an organosilane of the formula $$R^1{}_o SiX_{4-o} \quad \text{II}$$

wherein $R^1$ is one or more monovalent oleophilic organic groups bonded to Si by a carbon to Si bond and X is a hydrolyzable or condensable group bonded directly to Si and o is 1, 2 or 3.

In a desirable embodiment of the invention, there is provided in the emulsion formulation of the invention, a normally liquid hydroxy endblocked fluid of the formula $$HO-[-R^2 R^3 SiO-]_p-OH \quad \text{III}$$

wherein $R^2$ and $R^3$ are each the same or different nonfunctionalized organo groups bonded to Si by a carbon to silicon bond, and p has a value of at least 2.

In the preferred embodiment of the invention, the aqueous emulsion formulation contains an oil phase and a water phase, in which the oil phase comprises (A) about 0.1 to about 50 parts per 100 parts by weight of the formulation, of a normally liquid organopolysiloxane of the formula $$R_n R^o{}_m SiO_{(4-n-m)/2} \quad \text{I}$$

wherein n is a number averaging per Si in the range from about 0.001 to about 2.5. m is a number averaging per Si in the range from about 0.0001 to about 2, the average value of (4—n—m)/2 ranges from about 0.5 to 1.98, R is one or more organo groups bonded to the Si by a carbon to silicon bond, $R^o$ is an aminoorgano (i.e., amino-functionalized) group bonded to the Si by a carbon to Si bond, there are at least two amino-functionalized groups per molecule of liquid organopolysiloxane, and the ratio of the sum of R and $R^o$ to Si in the liquid organosiloxane about 3 to about 1.98; (B) about 0.001 to about 25 parts per 100 parts by weight of the formulation, of an organosilane of the formula $$R^1{}_o SiX_{4-o} \quad \text{II}$$

wherein $R^1$ is one or more monovalent oleophilic organic groups bonded to Si by a carbon to Si bond, X is a hydrolyzable or condensable group bonded directly to Si, and o is 1, 2, or 3; (C) 0 to 50 parts per 100 parts by weight of the formulation, of a normally liquid hydroxy endblocked fluid of the formula $$HO-[-R^2 R^3 SiO-]_p-OH \quad \text{III}$$

wherein $R^2$ and $R^3$ are each the same or different nonfunctionalized organo groups bonded to Si by a carbon to silicon bond, and p has a value of at least 2; and the sum of (A), (B) and (C) is about 0.1 to about 70 parts by weight of the formulation.

The formulation of the invention includes surfactants necessary to achieve the desired emulsion stability.

DETAILS OF THE INVENTION

In its broadest aspect, the amino-functional polyorganosiloxanes (a) have at least two amino or substituted amino groups linked to a siloxy unit through an organic bridge that is bonded to the silicon by a carbon to silicon bond and (b) they are liquids that are emulsifiable. The liquid amino functional polyorganosiloxanes may be linear, branched or cyclic structures. They are characterized by a viscosity ranging from about 1 to about 20,000 centipoises determined at 25°C.

The preferred amino-functional polyorganosiloxane is a linear structure possessing triorganosilyl endblocking. Illustrative of such amino-functional polyorganosiloxane are those of the following formula:

$$\begin{array}{c} R^4 \quad\quad R^4 \quad\quad R^4 \quad\quad R^4 \\ | \quad\quad\quad | \quad\quad\quad | \quad\quad\quad | \\ R^4-Si-(-O-Si-)_x(-O-Si-)_y-O-Si-R^4 \\ | \quad\quad\quad | \quad\quad\quad | \quad\quad\quad | \\ R^4 \quad\quad R^4 \quad\quad R^5 \quad\quad R^4 \\ \quad\quad\quad\quad\quad\quad | \\ \quad\quad\quad\quad\quad R^6-N-R^6 \end{array} \quad \text{IV.}$$

wherein $R^4$, which may be the same or different, is a monovalent hydrocarbon and includes alkyl such as methyl, ethyl, propyl, butyl and the like; aryl such as phenyl and tolyl; aralkyl such as benzyl; and groups wherein one or more hydrogen atoms of the above mentioned groups is substituted with halogen cyano, sulfhydryl or hydroxy. $R^5$ is an alkylene or an arylene having from 3 to 10 carbon atoms, or alkoxyalkyl or aroxyaryl containing 4 to 16 carbon atoms; $R^6$ is selected from hydrogen, one of the groups defined by $R^4$, and aminoorgano (i.e., amino-functionalized) of the formula $-R^5R^6NR^6$, where $R^5$ and $R^6$ are as defined; x is an integer equal or greater than 0; y is an integer large enough to provide at least two amino-functionalized groups per molecule, typically equal to or greater than 2; and the viscosity of the polyorganosiloxanes of formula I is from about 10 to about 10,000 centipoise at 25°C.

The corresponding cyclic amino-functional polyorganosiloxanes include structures of the formula

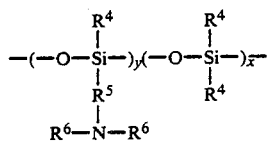   V.

Branched structures are polyorganosiloxanes that possess complimentary sesquioxide and monooxide structures that preclude crosslinked structures that would occur if the sesquioxide units were not capped by monooxide. For example, the following illustrates such capped sesquioxide units:

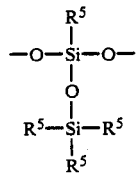

The preparation of the amino-functional polyorganosiloxanes is known to those skilled in the art. For example, using the method described by Kalinowski in U.S. Pat. No. 4,247,592, the amino-functional polydiorganosiloxanes can be prepared by equilibrating a triorganosiloxy-terminated siloxane such as hexamethyldisiloxane; a cyclopolydiorganosiloxane such as octamethylcyclotetrasiloxane; and a hydrolysate of an aminodialkoxysilane such as β-aminoethyl-Γ-aminopropyl-methyl-dimethoxysilane. The equilibration is carried out in the presence of a basic equilibration catalyst such as potassium hydroxide at an elevated temperature of 80°C. to 100°C. After the viscosity of the fluid reaches the desired value, the base catalyst is then neutralized with an acid.

The organosilane utilized in the emulsion formulation of the invention introduce a hydrolyzable functionality into the formulation. It is thus possible that during a curing process, the organosilanes which are added to the emulsions react with the amino-functionalized silicone polymer and become an integral part of the finish While not wishing to be bound by any theory over the function of the silane in the formulation, it is believed that a crosslinking reaction occurs between the amino functional polyorganosiloxane and the silane. According to Si-29 Nuclear Magnetic Resonance Spectroscopic analysis, in-situ generation of silanol species is discovered in the amino silicone emulsions typical of this invention. Even though the starting amino-functional polysiloxanes contain only a trace amount of silanols, the emulsions prepared from these materials showed a substantial increase of silanol functionality. The magnitude of the increase appears to be dependent on the amino content of the polyorganosiloxane. It is therefore believed that crosslinking reaction occurs between the silanol groups of an amino-functional polysiloxane and a silane which are present in the emulsion. The reaction occurs partially in the emulsion but completely during the curing process of a fiber or a fabric substrate which is treated with an emulsion composition mentioned in this invention.

It is believed contrary to the general expectations that the addition of silanes, which are described in the present invention, to the above mentioned stable emulsions would not adversely affect the stability of the emulsions. In several instances, the addition of the silane actually improves the stability of the emulsions.

As indicated above, the organosilane useful in the formulations of the invention are of the formula

   II wherein $R^1$ is one or more monovalent oleophilic organic groups bonded to Si by a carbon to Si bond and X is a hydrolyzable or condensable group bonded directly to Si. Preferably, $R^1$ is a monovalent oleophilic organic group that is free of functionality that is reactable with the amino functionality of the polyorganosiloxane. Illustrative of such a group is alkyl of 1 to about 18 carbon atoms, preferably 1 to about 10 carbon atoms, aryl, cycloalkyl, aralkyl, alkaryl, alkenyl, haloalkyl, haloaryl, oleophilic aliphatic or aromatic ether and sulfide, and the like. Preferably, X is alkoxy of 1 to about 6 carbon atoms, acyloxy of 1 to about 6 carbon atoms, and the like. The silanes are functionally mono-, di-, or tri- hydrolyzable and therefore o is 1, 2 or 3.

The invention contemplates the use of mixed organosilane compositions without deleteriously affecting the stability and performance of the emulsions. Thus, it is possible to add, in addition to the above-mentioned organosilane, organosilanes of the formula:

   VI wherein $R^8$ is one or more monovalent hydrophilic organic groups bonded to Si by a carbon to Si bond and X is a hydrolyzable or condensable group bonded directly to Si. More particularly, preferably $R^8$ is a monovalent hydrophilic organic group that is free of functionality that is reactable with the amino functionality of the polyorganosiloxane. Illustrative of such groups are those of the formula

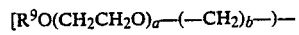

wherein $R^9$ is an alkyl group containing 1 to about 4 carbon atoms, preferably 1 to 3 carbon atoms, and the like, a is 0 to about 15. and b is 1, 3 or 4. Preferably, X is alkoxy of 1 to about 6 carbon atoms, acyloxy of 1 to about 6 carbon atoms, and the like. The silane are functionally mono-, di-, or tri-hydrolyzable and therefore r is 1, 2 or 3. Preferably, these additional silanes are provided in amounts equal to or less than, on a weight basis, the preferred organosilanes of the formula

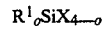   II

The hydroxy-terminated polydiorganosiloxanes that may be optionally provided in the formulation of the invention may have the following formula:

VII.

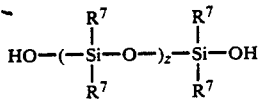

wherein $R^7$ is as previously defined for $R^4$; z is an integer equal to or greater than 1; and the viscosity of the hydroxy terminated polysiloxane is from about 1 to about 20,000 centipoise at 25°C. Such hydroxy terminated polydiorganosiloxanes are known compositions and the methods for their manufacture are well known.

The amino polysiloxane, if so preferred, can be mixed with the hydroxy terminated polysiloxane before emulsification. Emulsification can be achieved using a non-ionic surfactant, a cationic surfactant or a mixture thereof. Suitable emulsifying agents for the preparation of a stable aqueous emulsion are known in the art. Examples for nonionic surfactants include polyoxyethylene alkyl ether, polyoxyethylene alkylphenol ether, polyoxyethylene alkyl ester, polyoxyethylene sorbitan alkyl ester, polyethylene glycol, polypropylene glycol and polyoxyalkylene glycol modified polysiloxane surfactants. Examples for cationic surfactants include guaternary ammonium salts such as alkyltrimethylammonium hydroxide, dialkyldimethylammonium hydroxide, methylpolyoxyethylene cocoammonium chloride and dipalmityl hydroxyethylammonium methosulfate. Preferably, a combination of two or three nonionic surfactants, or a combination of a cationic surfactant with one or two nonionic surfactants is used in the present invention. The level of the surfactants for the preparation of a stable emulsion described in this invention is not particularly critical, but preferably in the range of 5 to 50 parts by weight per 100 parts of total silicones. The solid content of the emulsion is also not critical, but preferably it is in the range of 0.1% to 50% based on the total weight of the emulsion. After an emulsion is formed with the amino-functionalized silicone, with or without the hydroxy-terminated polydiorganosiloxane, then the desired silane can be added, typically with stirring or blending with a roll mill, to form the compositions of the invention.

The level of an alkoxysilane which can be added to an amino polysiloxane emulsion without affecting the stability of the emulsion, varies with the type of the silane. The molecular weight, the number of the hydrolyzable group, e.g., alkoxy, and the substituents on the $R^1$ group in the molecule of the silane are some of the factors controlling the concentration of the alkoxysilane in the stable emulsion. As a general rule, the amount of silane of formula II may be as little as about 0.1% to about 40%, based on the total weight of silicones in the formulation. Illustratively, for many alkoxysilanes, such as phenyltrimethoxysilane, the concentration of the silane can be as high as 35% or higher, based on the total weight of silicones. Essentially all of the silanes of formula II are effective at the lower concentrations.

The emulsion composition of the present invention can be diluted with water to a desired solids level and applied onto a fiber or a fabric substrate using any suitable method, such as spraying, dipping or kiss roll application. Indeed, it will be more common to prepare the emulsions at a higher solids content in order to reduce shipping and/or handling costs and then dilute the formulation with water just prior to use. The more dilute the emulsion formulation, the better is its ability to wet the textile undergoing treatment. After the substrate is dried either at room temperature or by heat, it is then cured at a temperature less than the melting or decomposition temperature of the substrate. Heating can be done by any suitable method, but preferably is done by passing the substrate through a hot air oven. The resulting treated substrate thus has durable properties such as slickness, softness, compression resistance, water repellency or hydrophilicity.

The fibrous substrate which can be treated with the emulsion composition of this invention is exemplified by natural fibers such as cotton, flax, silk and wool; synthetic fibers such as polyester, polyamide, polyacrylonitrile, polyethylene, polypropylene and polyurethane; and inorgnaic fibers such as glass fiber and carbon fiber. The fabric substrate which can be treated with the present inventive composition is exemplified by the fabrics produced from the above mentioned fibrous materials

EXPERIMENTAL

Description of Test Methods

Emulsion Stability:

A stable emulsion meets the following criteria: The emulsion must retain its integrity after (1) heating at 50°C. for at least three days, and (2) three cycles of a freeze-thaw test.

The 50°C. stability test is done in a constant temperature oven. Most of the emulsions of the invention exhibit stability at 50°C. far beyond three days. The Freeze-thaw test is done by freezing a sample in a −15°C. freezer followed by slow thawing at room temperature.

Fiber Slickness:

A DuPont ® unslickened fiberfill product, i.e., Hollofil ® T-808, is used for the evaluation of slickness imparted by the application of the silicone emulsion described in this invention. A piece of Hollofil ® T-808 is soaked in the diluted emulsion of interest and then passed through a roller to obtain 100% wet pick-up, i.e, the weight of the finished fiberfill is twice that of the unfinished fiberfill. After drying at room temperature, the finished sample is heated at 170°C. for 10 minutes. Thus prepared, the finished fiberfill usually contains approximately the same silicone level as that of the emulsion of interest.

The slickness of fiberfill is measured by staple pad friction which is deduced from the force required to pull a certain weight over a fiberfill staple pad. The staple pad friction is defined as the ratio of the force over the applied weight. A 10 pound weight was used in the friction measurement of this invention. A typical instrument set-up includes a friction table which is mounted on the crosshead of an Instron tensile tester. The friction table and the base of the weight are covered with Emery Paper #320 from the 3M Company so that there is little relative movement between the staple pad and the weight or the table. Essentially all the movement is a result of fibers sliding across each other. The weight is attached to a stainless steel wire which runs through a pulley mounted at the base of the Instron tester. The other end of the stainless steel wire is tied to the loadcell of the Instron tester.

Durability of Slickness:

The durability of slickness is determined using two methods: (1) laundering, and (2) solvent extraction.

Laundering is performed according to American Association of Textile Chemists and Colorists (AATCC) standard procedures. Staple pad friction is measured after 5 cycles of washing at 120°F. (67°C.) with ½ cup of AATCC standard detergent 124, rinsing at 105°F. and drying at 140-160°F. Solvent extraction is done using 30 fold excess perchloroethylene over the fiberfill sample and mixing for 2 hours using a roll mill. Staple pad friction is monitored after 3 cycles of solvent extraction.

The following examples are given to further illustrate the present invention, but should not be construed as limiting its scope. All parts and percentages are by weight unless otherwise noted. The materials designated TERGITOL® and UNION CARBIDE® are products sold by Union Carbide Corporation, Danbury, Conn. 06817 U.S.A.

EXAMPLE 1

An emulsion was prepared by blending 2.4 parts of a polyoxyethylene alkyl ether TERGITOL® 15-S-15,[1] 1.6 parts of another polyoxyethylene alkyl ether TERGITOL® 15-S-3,[2] 56 parts of water and 40 parts of an amino polysiloxane having the following formula

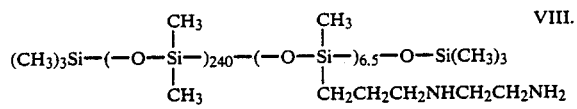

VIII.

1. Ethoxylate of $C_{11-15}$ secondary alcohols, averaging 15 moles of ethylene oxide per mole of alcohol, having an average molecular weight of 860, and a HLB (calculated) of 15.4.
2. Ethoxylate of $C_{11-15}$ secondary alcohols, averaging 3 moles of ethylene oxide per mole of alcohol, having an average molecular weight of 332, and a HLB (calculated) of 8.0.

*The resultant stable emulsion is thus designated as Emulsion I. Different levels of silanes were then added, with mixing, to Emulsion I and the emulsion stability was tested. Table I summarized some of the emulsion compositions which are stable at 50°C. for 35 days and after three cycles of freeze-thaw.

TABLE I

| Stable Emulsion Composition | % Silane in Emulsion |
|---|---|
| (a) 0.75 part methyltrimethoxysilane (UNION CARBIDE ® A-163) and 9.25 parts Emulsion I | 7.5% |
| (b) 1 part methyltriethoxysilane (UNION CARBIDE ® A-162) and 9 parts Emulsion I | 10% |
| (c) 2 parts chloropropyltrimethoxysilane (UNION CARBIDE ® A-143) and 8 parts Emulsion I | 20% |
| (d) 2 parts octyltrimethoxysilane and 8 parts Emulsion I | 20% |
| (e) 2 parts phenyltrimethoxysilane and 8 parts Emulsion I | 20% |

EXAMPLE 2

Emulsion I, which is described in Example 1, was mixed with an equal part of UNION CARBIDE® LE-743HS, which is a milky white liquid nonionic emulsion containing a hydroxy terminated polydimethylsiloxane having a viscosity of 70 centistokes determined at 25°C., a solids content ranging between 58.0-62.0%, and a pH at 25°C. of 6.5-8.5. The following are examples of stable emulsions prepared by the addition of mixed silanes to this particular emulsion blend:

(A)

1 part UNION CARBIDE® A-163
9 parts $(CH_3O)_3SiC_3H_6(OCH_2CH)_7OCH_3$ (UNION CARBIDE® Y-5560)
45 parts UNION CARBIDE® LE-743HS
45 parts Emulsion I (B)

5 parts UNION CARBIDE® A-163
5 parts UNION CARBIDE® Y-5560
45 parts UNION CARBIDE® LE-743HS
45 parts Emulsion I

EXAMPLE 3

Eleven parts of UNION CARBIDE® A-163 (methyltrimethoxysilane), or 14 parts of UNION CARBIDE® A-162 (methyltriethoxsilane), was mixed with 800 parts of Emulsion I, which is described in Example 1, using a roll mill. The resultant emulsions were diluted with appropriate amounts of water to contain 0.75% or 0.4% silicone actives. The diluted emulsions were used to treat DuPont® Hollofil® T-808 and the staple pad friction was measured before and after laundering and solvent extraction according to the procedures described in the preceding "Description of Test Methods" section. The durability of slickness imparted by the treatments is apparent from the friction data listed in Table II.

TABLE II

| Sample | Initial Friction | Friction After Laundering | Friction After Solvent Extraction |
|---|---|---|---|
| (a) Hollofil ® T-808 | 0.50 | | |
| (b) Hollofil ® T-808 with 0.75% finish of Emulsion I/A-163 | 0.25 | 0.27 | 0.25 |
| (c) Hollofil ® T-808 with 0.4% finish of Emulsion I/A-163 | 0.26 | 0.28 | 0.25 |
| (d) Hollofil ® T-808 with 0.75% finish of Emulsion I/A-162 | 0.25 | 0.27 | 0.26 |
| (e) Hollofil ® T-808 with 0.4% finish of Emulsion I/A-162 | 0.26 | 0.29 | 0.26 |

EXAMPLE 4

Seven parts of the same amino polysiloxane as described in Example 1 were blended with 3 parts of a 18,000 centistoke hydroxy terminated polydimethylsiloxane. An emulsion was prepared using the same emulsifiers described in Example 1 to contain 40% of this silicone blend. Fourteen parts of UNION CARBIDE® A-162 was blended with 800 parts of the resultant emulsion and diluted with appropriate amounts of water to contain 0.75% and 0.4% silicone actives. The dilute emulsions were applied onto Hollofil® T-808 and the staple pad friction was measured before and after laundering and solvent extraction. Table III shows the excellent durability of slickness provided by the finish.

TABLE III

| Sample | Initial Friction | Friction After Laundering | Friction After Solvent Extraction |
|---|---|---|---|
| (a) Hollofil ® T-808 | 0.50 | | |
| (b) Hollofil ® T-808 | 0.26 | 0.28 | 0.26 |

TABLE III-continued

| Sample | Initial Friction | Friction After Laundering | Friction After Solvent Extraction |
|---|---|---|---|
| with 0.75% finish (c) Hollofil ® T-808 with 0.4% finish | 0.26 | 0.29 | 0.26 |

I claim:

1. A process for the preparation of an aqueous emulsion composition having improved long term stability which comprises the addition of water and one or more oil soluble hydrolyzable hydrocarbyl silanes of the formula $$R^1{}_cSiX_{4-c}$$

wherein $R^1$ is one or more monovalent oleophilic organic groups bonded to Si by a carbon to Si bond, X is a hydrolyzable group bonded directly to Si, and c is 1, 2, or 3 to an aqueous emulsion containing an amino-functionalized polyorganosiloxane of the formula $$R_nR^o{}_mSiO_{(4-n-m)/2}$$

wherein n is a number averaging per Si in the range from 0.001 to about 2.5, m is a number averaging per Si in the range from about 0.0001 to about 2, the average value of (4-n-m)/2 ranges from about 0.5 to 1.98, R is one or more organo groups bonded to the Si by a carbon to silicon bond, $R^o$ is an aminoorgano group bonded to the Si by a carbon to silicon bond and wherein there are at least two amino-functionalized groups per molecule of polyorganosiloxane and the ratio of the sum of R and $R^o$ to Si is about 3 to about 1.98; and wherein said polyorganosiloxane has triorganosilyl endblocking of the following formula:

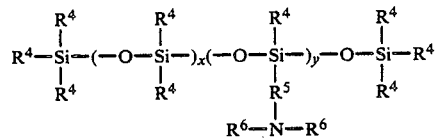

wherein $R^4$, which may be the same or different, is a monovalent hydrocarbon, $R^5$ is an alkylene or an arylene having from 3 to 10 carbon atoms, or alkoxyalkyl or aroxyaryl containing 4 to 16 carbon atoms; $R^6$ is selected from hydrogen, one of the groups defined by $R^4$, and aminoorgano of the formula $-R^5R^6NR^6$, where $R^5$ and $R^6$ are as defined; x is an integer equal to or greater than 0; y is an integer large enough to provide at least two amino-functionalized groups per molecule; and the viscosity of the polyorganosiloxanes is from about 10 to about 10,000 centipoise at 25°C.; and optionally, a hydroxy terminated polydiorgansiloxane of the formula $$HO-[-R^2R^3SiO-]_p-OH$$

wherein $R^2$ and $R^3$ are each the same or different non-functionalized organo groups bonded to Si by a carbon to silicon bond, and p has a value of at least 2.

2. An aqueous emulsion composition having improved long term stability comprising
   (i) water
   (ii) an amino-functionalized polyorganosiloxane of the formula $$R_nR^o{}_mSiO_{(4-n-m)/2}$$

wherein n is a number averaging per Si in the range from 0.001 to about 2.5, m is a number averaging per Si in the range from about 0.0001 to about 2, the average value of (4-n-m)/2 ranges from about 0.5 to 1.98, R is one or more organo groups bonded to the Si by a carbon to silicon bond, $R^o$ is an aminoorgano group bonded to the Si by a carbon to silicon bond and wherein there are at least two amino-functionalized groups per molecule of polyorganosiloxane and the ratio of the sum of R and $R^o$ to Si is about 3 to about 1.98; and wherein said polyorganosiloxane has triorganosilyl endblocking of the following formula:

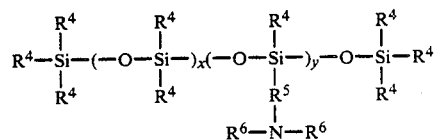

wherein $R^4$, which may be the same or different, is a monovalent hydrocarbon, $R^5$ is an alkylene or an arylene having from 3 to 10 carbon atoms, or alkoxyalkyl or aroxyaryl containing 4 to 16 carbon atoms; $R^6$ is selected from hydrogen, one of the groups defined by $R^4$, and aminoorgano of the formula $-R^5R^6NR^6$, where $R^5$ and $R^6$ are as defined; x is an integer equal to or greater than 0; y is an integer large enough to provide at least two amino-functionalized groups per molecule; and the viscosity of the polyorganosiloxanes is from about 10 to about 10,000 centipoise at 25°C.; and (iii) one or more oil soluble hydrolyzable hydrocarbyl silanes of the formula $$R^1{}_cSiX_{4-c}$$

wherein $R^1$ is one or more monovalent oleophilic organic groups bonded to Si by a carbon to Si bond, X is a hydroyzable group bonded directly to Si, and c is , 1, 2, or 3 and optionally a hydroxy terminated polydiorganosiloxane of the formula $$HO-[-R^2R^3SiO-]_p-OH$$

wherein $R^2$ and $R^3$ are each the same or different non-functionalized organo groups bonded to Si by a carbon to silicon bond, and p has a value of at least 2.

3. An aqueous emulsion composition having improved long term stability containing an oil phase and a water phase, wherein there is provided in the emulsion a normally liquid polyoganosiloxane of the formula $$R_nR^o{}_mSiO_{(4-n-m)/2}$$

wherein n is a number averaging per Si in the range from about 0.001 to about 2.5, m is a number averaging per Si in the range from about 0.0001 to about 2, the average value of (4-n-m)/2 ranges from about 0.5 to 1.98, R is one or more organo groups bonded to the Si by a carbon to silicon bond, $R^o$ is an aminoorgano group bond to the Si by a carbon to Si bond, there are at least two amino-functionalized groups per molecule of liquid polyorganosiloxane, and the ratio of the sum of R and $R^o$ to Si in the liquid polyorganoxiloxane is about 3 to about 1.98 and wherein the polyorganosiloxane has triorganosilyl endblocking of the following formula:

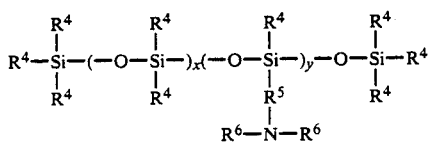

wherein $R^4$, which may be the same or different, is a monovalent hydrocarbon, $R^5$ is an alkylene or an arylene having from 3 to 10 carbon atoms, or alkoxyalkyl or aroxyaryl containing 4 to 16 carbon atoms; $R^6$ is selected from hydrogen, one of the groups defined by $R^4$, and aminoorgano of the formula $-R^5R^6NR^6$, where $R^5$ and $R^6$ are as defined; x is an integer equal to or greater than 0; y is an integer large enough to provide at least two amino-functionalized groups per molecule; and a hydrocarbyl silane of the formula

wherein $R^1$ is one or more monovalent oleophilic organic groups bonded to Si by a carbon to Si bond and X is a hydrolyzable group bonded directly to Si and c is 1, 2 or 3.

4. The emulsion composition of claim 3 wherein there is provided in the emulsion composition a normally liquid hydroxy terminated polydiorganosiloxane of the formula

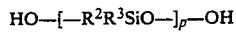

wherein $R^2$ and $R^3$ are each the same or different non-functionalized organo groups bonded to Si by a carbon to silicon bond, and p has a value of at least 2.

5. The aqueous emulsion composition of claim 4 wherein the composition contains an oil phase and a water phase, wherein the oil phase comprises (A) about 0.1 to about 50 parts per 100 parts by weight of the emulsion of said normally liquid polyorganosiloxane, (B) about 0.001 to about 25 parts per 100 parts by weight of the emulsion of said hydrocarbyl silane, and (C) 0 to 50 parts per 100 parts by weight of the emulsion of said normally liquid hydroxy terminated polydiorganosiloxane; and wherein the sum of (A), (B) and (C) is about 0.1 to about 70 parts by weight of the emulsion.

6. The composition of claim 3 wherein there is provided at least one of a cationic and nonionic surfactant.

7. The composition of claim 3 wherein $R^4$ is alkyl, aryl, aralkyl, and groups wherein one or more hydrogen atoms of the alkyl, aryl or aralkyl is substituted with halogen, cyano, sulfydryl or hydroxy.

8. The composition of claim 3 wherein the hydrocarbyl silane is a mixed organosilane composition containing in addition organosilanes of the formula:

wherein $R^8$ is one or more monovalent hydrophilic organic groups bonded to Si by a carbon to Si bond and X is a hydrolyzable group bonded directly to Si, and r is 1, 2 or 3.

9. The composition of claim 8 wherein $R^8$ are monovalent hydrophilic organic groups that are free of functionality that is reactable with the amino functionality of the polyorganosiloxane.

10. The composition of claim 9 wherein $R^8$ groups of the formula

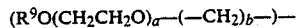

wherein $R^9$ is an alkyl group containing 1 to about 4 carbon atoms, a is 0 to about 15, and b is 1, 3 or 4.

11. The composition of claim 10 wherein X is alkoxy of 1 to about 6 carbon atoms and acyloxy of 1 to about 6 carbon atoms.

12. The composition of claim 11 wherein the additional organosilanes are provided in amounts equal to or less than, on a weight basis, the hydrocarbyl silanes of the formula

13. A method for the treatment of textiles which comprises impregnating a textile with an aqueous emulsion composition having improved long term stability containing an oil phase and a water phase, wherein there is provided in the emulsion a normally liquid polyorganosiloxane of the formula

wherein n is a number averaging per Si in the range from about 0.001 to about 2.5, m is a number averaging per Si in the range from about 0.0001 to about 1, the average value of (4-n-m)/2 ranges from about 0.5 to 1.98 R is one or more organo groups bonded to the Si by a carbon to silicon bond, $R^o$ is an aminoorgano group bonded to the Si by a carbon to Si bond, there are at least two amino-functionalized groups per molecule of liquid organopolysiloxane, and the ratio of the sum of R and $R^o$ to Si in the liquid polyorganosiloxane is about 3 to about 1.98 and wherein the polyorganosiloxane has triorganosilyl endblocking of the following formula:

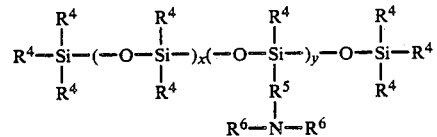

wherein $R^4$, which may be the same or different, is a monovalent hydrocarbon, $R^5$ is an alkylene or an arylene having from 3 to 10 carbon atoms, or alkoxyalkyl or aroxyaryl containing 4 to 16 carbon atoms; $R^6$ is selected from hydrogen, one of the groups defined by $R^4$, and aminoorgano of the formula $-R^5R^6NR^6$, where $R^5$ and R are as defined; x is an integer equal to or greater than 0; y is an integer large enough to provide at least two amino-functionalized groups per molecule; and a hydrocarbyl silane of the formula

wherein $R^1$ is one or more monovalent oleophilic organic groups bonded to Si by a carbon to Si bond and X is a hydrolyzable group bonded directly to Si and c is 1, 2 or 3.

14. The method of claim 13 wherein there is provided in the emulsion composition a normally liquid hydroxy terminated polydiorganosiloxane of the formula

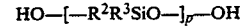

wherein $R^2$ and $R^3$ are each the same or different nonfunctionalized organo groups bonded to Si by a carbon to silicon bond, and p has a value of at least 2.

15. The method of claim 14 wherein the emulsion composition contains an oil phase and a water phase, wherein the oil phase comprises (A) about 0.1 to about 50 parts per 100 parts by weight of the emulsion of said normally liquid polyorganosiloxane, (B) about 0.001 to about 25 parts per 100 parts by weight of the emulsion of said hydrocarbyl silane, and (C) 0 to 50 parts per 100 parts by weight of the emulsion of said normally liquid hydroxy terminated polydiorganosiloxane; and the sum of (A), (B) and (C) is about 0.1 to about 70 parts by weight of the emulsion.

16. The method of claim 15 wherein the emulsion composition there is provided at least one of acationic and nonionic surfactant.

17. Textiles treated with the aqueous emulsion composition of claim 2.

18. The aqueous emulsion composition of claim 3 wherein the polyorganosiloxane has the formula

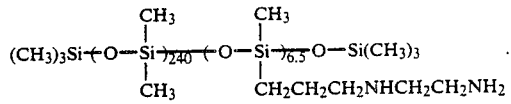

* * * * *